United States Patent [19]

Romeijn

[11] Patent Number: 5,457,691
[45] Date of Patent: Oct. 10, 1995

[54] METHOD AND APPARATUS FOR INTRASYSTEM COMMUNICATION LINKS IN A TRANSMISSION SYSTEM USING SYNCHRONOUS DATA HIERARCHY

[75] Inventor: Erik A. L. Romeijn, Huizen, Netherlands

[73] Assignee: AT&T Corp, Murray Hill, N.J.

[21] Appl. No.: 168,559

[22] Filed: Dec. 16, 1993

[51] Int. Cl.$^6$ ............................................... H04J 3/06
[52] U.S. Cl. .............................. 370/105.1; 370/110.1; 370/112
[58] Field of Search ........................ 370/84, 79, 99, 370/112, 60, 82, 83, 94.1, 102, 105.1, 110.1, 111, 58.1–58.3

[56] References Cited

U.S. PATENT DOCUMENTS

| | | | |
|---|---|---|---|
| 5,040,170 | 8/1991 | Upp et al. ................................. | 370/112 |
| 5,168,494 | 12/1992 | Mueller ....................................... | 370/112 |
| 5,210,745 | 5/1993 | Guinund et al. .......................... | 370/112 |

OTHER PUBLICATIONS

CCITT Blue Book, vol. III, General Aspects of Digital Transmission Systems; Terminal Equipments, 9th Plenary Assembly, Melbourne, Nov. 14–25, 1988, Recommendations G.707

*Primary Examiner*—Benedict V. Safourek
*Assistant Examiner*—Ajit Patel

[57] ABSTRACT

The present invention provides an innovative method of transmitting a multiframe signal generated in accordance with the international standard synchronous data hierarchy. Multiframe signals comprising a plurality of standard containers may be transmitted within a network node or system employing an STM-1 frame in a novel manner. Each standard container is provided directly to an STM-1 frame processor. The STM-1 frame processor creates a modified STM-1 frame for transmission. Because the VC-4 path overhead is not generated, the multiframe synchronization (MFS) information for the standard container is written to the STM-1 user definable F1 byte by a link processor. The modified STM-1 is then converted to an optical signal and transmitted to a remote part of the node where the STM-1 is received. The STM-1 overhead is thereafter removed and the contents of the F1 user byte is obtained. The receiving node uses the MFS information to access the data contained within the multiframe signal.

9 Claims, 4 Drawing Sheets

METHOD AND APPARATUS FOR INTRASYSTEM COMMUNICATION LINKS IN A TRANSMISSION SYSTEM USING SYNCHRONOUS DATA HIERARCHY

FIELD OF THE INVENTION

The present invention relates generally to data transmission, and in particular, to intrasystem communication in networks employing the international standard synchronous data hierarchy.

BACKGROUND OF THE INVENTION

To facilitate data communication over an international network, a standard has been promulgated to define the communication protocol for use in optical digital networks. This standard is discussed in detail in International Telecommunication Union, CCITT, *General Aspects Of Digital Transmission Systems* Recommendations G.707–G.709 (Geneva 1989), which is incorporated herein by reference. The CCITT standard known as the Synchronous Data Hierarchy ("SDH" or "the standard") defines a hierarchy of data containers and their pointers for standardized high bit rate transmission. Under the CCITT hierarchy, data signals are, in general, mapped into containers and then transmitted in transport module frames. Recommendation G.708 §2.2. The SDH defines several types of standard data containers, thereby allowing SDH to accommodate data signals operating at various standard bit rates. See, for example, CCITT FIG. 1-1/G.709.

Under one implementation of the standard that is experiencing widespread use, sixty-three 2 Mbit/s data signals are mapped into VC-12 containers, multiplexed and transmitted using transport module frames. The multiplexed VC-12 containers are first arranged into larger data containers known as C-4 containers. Each C-4 container is designed to fit into one transport module frame known as an STM-1 frame. Because of the respective sizes of the C-4 and VC-12, containers, sixty-three multiplexed VC-12 containers do not fit within one C-4 container and must be split over four consecutive C-4 containers, and therefore, four consecutive STM-1 frames. The four frame signal sequence is known as a multiframe signal.

Under the SDH standard, a C-4 container is converted into a VC-4 container before it is placed into an STM-1 frame. The VC-4 adds critical overhead data, including, in particular, data indicating the VC-4 container's position within the multiframe signal sequence. With this multiframe position data, referred to as multiframe synchronization (MFS) information, the terminal equipment at a node within the network receiving STM-1 signals can determine the beginning and end of a multiframe signal. Without the MFS information, the VC-12 data within the STM-1 signals cannot be accessed for reasons that will become clear hereinafter. The standard C-4 container is equivalent to a VC-4 in most respects, with the exception that the VC-4 also contains path overhead information.

The digital optical network that transports the SDH-formatted signals includes various nodes that provide maintenance, trafficking and error checking functions. One such node cross-connects data that is received as STM-1 frames on the VC-12 level. This node, called a cross connect node, rebuilds new STM-1 cells after cross-connection for transmission over the system. The node cross connect circuitry, however, does not cross-connect data directly from the STM-1 frames. Instead, the node circuitry must process the STM-1 frame to reproduce the data in the form of C-4 containers, which are simply multiplexed columns of VC-12 data. The presentation of data in C-4 container form facilitates cross-connecting on the VC-12 level.

Moreover, the node containing the cross connect circuitry does not receive data exclusively in the STM-1 format. In addition, the node may receive lower order signals, including, for example, plesiochronous 2 Mbit/s signals (CCITT standard), that must be mapped to VC-12 containers and multiplexed into standard container format. In either case, the cross-connecting circuitry is designed to handle data that has been converted to the standard C-4 container format.

The physical structure of the cross connect node may comprise several physical component racks or subracks in order to accommodate several input/output ports. In order to allow for flexibility in the physical configuration of the several subracks, the system must be capable of transmitting data considerable distances between subracks. Such flexibility necessitates intranodal or intrasystem communication over distances that may well be in excess of 10 meters. The transmission of standard containers or C-4 containers within the node at sufficiently high bit rates requires the use of communication links. Such intrasystem communication requires a communications protocol to transfer data between the input/output racks and the cross connect core circuitry.

One way to facilitate intrasystem communications is to transport the standard containers using the SDH standard STM-1 frame. Such an approach is logical considering that the standard container is already structured for use in this context. However, the SDH requires that each standard container, in other words, each group of multiplexed VC-12 containers, must first be mapped into a VC-4 container, which in turn requires the generation of a path overhead. See, for example, CCITT Recommendation FIG. 5-1/G.708. Because generation of the VC-4 and its path overhead requires additional hardware in the intrasystem link, it provides a less than optimal solution.

An alternative method is to employ a separate communications protocol to deliver the standard container intact. The implementation of a new protocol, however, would likely incur significant development costs and delays. Because such costs and delays would be incurred and a new protocol would presumably introduce non-standard codes into the data, this solution is also less than optimal.

It is therefore an object of the invention to provide a method and apparatus of transporting multiframe signals of VC-12 data in standard container form within a network node without requiring unnecessary hardware or significant development costs.

SUMMARY OF THE INVENTION

The present invention uses an innovative method of transmitting a multiframe signal comprising a plurality of standard containers within a network node or system employing an modified STM-1 frame. Each standard container is provided directly to a means for generating an STM-1 overhead. The STM-1 overhead generating means creates a modified STM-1 frame for transmission. To compensate for the fact that no VC-4 path overhead is generated, the multiframe information for the standard container is written to the STM-1 user definable F1 byte by a means for writing to the STM-1 user byte.

The modified STM-1 may then be transmitted to a remote part of the node or system. At the receiving end, the STM-1 overhead is removed and the contents of the F1 user byte obtained. The present invention facilitates savings in time and circuitry that would be required to build a proper STM-1 frame, including the VC-4 and its path overhead for every intrasystem transfer of standard container formatted data.

DETAILED DESCRIPTION

The present invention provides a novel communication link that may be utilized in a cross connect node of a communication network. The cross connect node switches data at the VC-12 level that is either received as STM-1 frames or lower order data signals.

Figure 1:
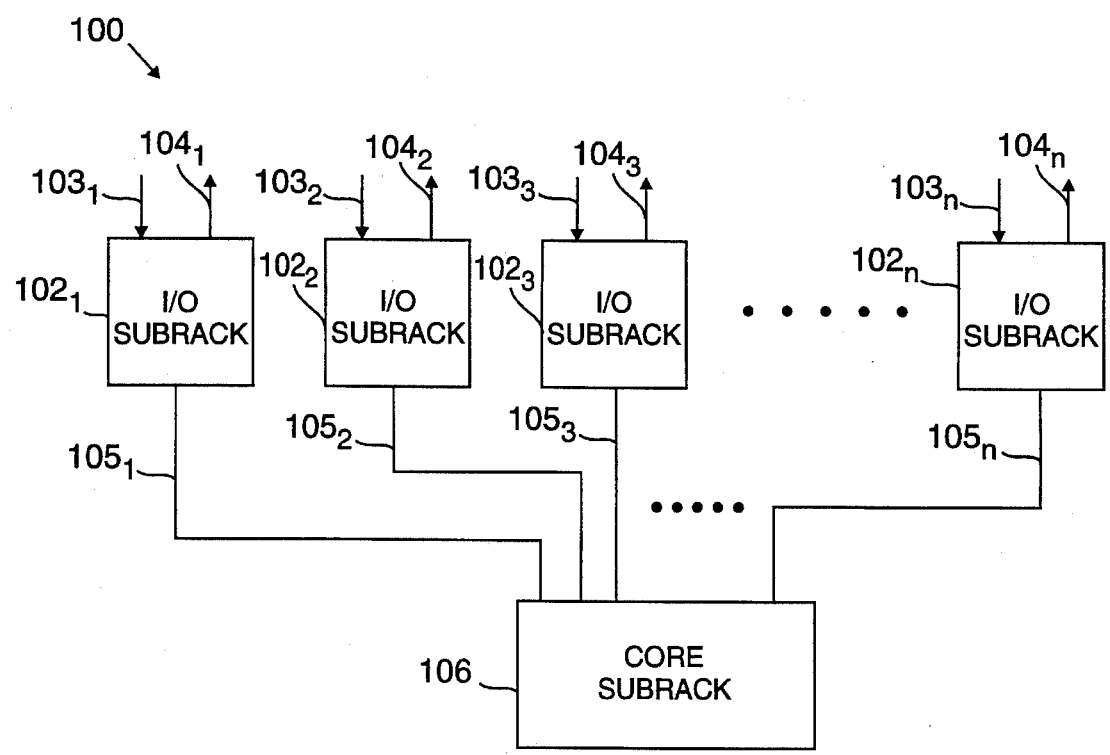
FIG. 1 illustrates a digital cross connect node that utilizes the method of intrasystem communication according to the present invention.

FIG. 1 illustrates a digital cross connect node or system 100 which utilizes a method of intrasystem communication according to the present invention. The cross connect system 100, provides controlled cross-connection of data containers at the VC-12 level.

In general, the cross connect system 100 comprises the following components arranged in subracks. Up to n input/output subracks $102_1 \ldots 102_n$ are connected to the optical network, not shown, through input ports $103_1 \ldots 103_n$ and output ports $104_1 \ldots 104_n$. Transmission lines $105_1 \ldots 105_n$ connect and facilitate data communication between the input/output subracks $102_1 \ldots 102_n$ and the cross-connect core subrack 106. Transmission lines $105_1 \ldots 105_n$ may suitably be coaxial fiber with a length of on the order of 10 meters, or optical fiber that may be substantially greater than 10 meters. The use of such transmission lines allows for flexible physical configuration of the various subracks. The cross connect core subrack 106 includes circuitry capable of column switching VC-12 containers presented in standard C-4 container format, employing a time-space-time Clos network. Circuitry capable of performing such functions is well known in the art.

There may be up to as many as two hundred fifty-six input/output subracks $102_1 \ldots 102_n$. Systems having greater capabilities and incorporating more subracks are also contemplated by the current invention. The cross connect system 100 further contains a control portion, not shown, which is connected to each of the input port subracks $102_1 \ldots 102_n$, and the cross-connect core subrack 106. The control section may comprise a local area network control system that initializes, configures, and manages the various subracks in the system.

Incoming signals arrive through facilities connected to ports $103_1 \ldots 103_n$ of the input port subracks $102_1 \ldots 102_n$. The incoming signals may suitably be STM-1 signals such as those discussed above, or signals containing lower order forms of data, such as 2 Mbit/s CEPT-1 signals. If the incoming signals are STM-1 frames comprising multiframe signals, the input port processes the STM-1 frames into a multiframe signal of standard containers having a structure as discussed below in connection with FIG. 3. If, however, the incoming signals are lower order signals, they may be mapped into VC-12 containers which are then multiplexed to form a multiframe signal of standard containers.

As discussed above, a standard container may suitably comprise sixty-three multiplexed VC-12 containers and typically includes nine unused columns such that the standard frame comprises the dimensions of the STM-1 frame payload portion. The standard containers are transmitted over lines $105_1 \ldots 105_n$ to the cross connect core 106 using modified STM-1 frames according to the method of the present invention such as those produced by the method discussed below in conjunction with FIG. 2.

The standard containers are received and removed from the modified STM-1 frames at the cross connect core subrack 106. The standard containers enter the cross connect core subrack 106 and are switched at the VC-12 level. In other words, individual VC-12s are extracted from the standard containers and combined to form new standard containers. The new standard containers are then transported back to the input/output subracks $102_1 \ldots 102_n$, using modified STM-1 frames according to the present invention. The input/output subracks $102_1 \ldots 102_n$ may then process the STM-1 frames into either standard STM-1 frames or any other suitable data configuration, such as CEPT-1 signals, for transmission over the network.

Figure 2:
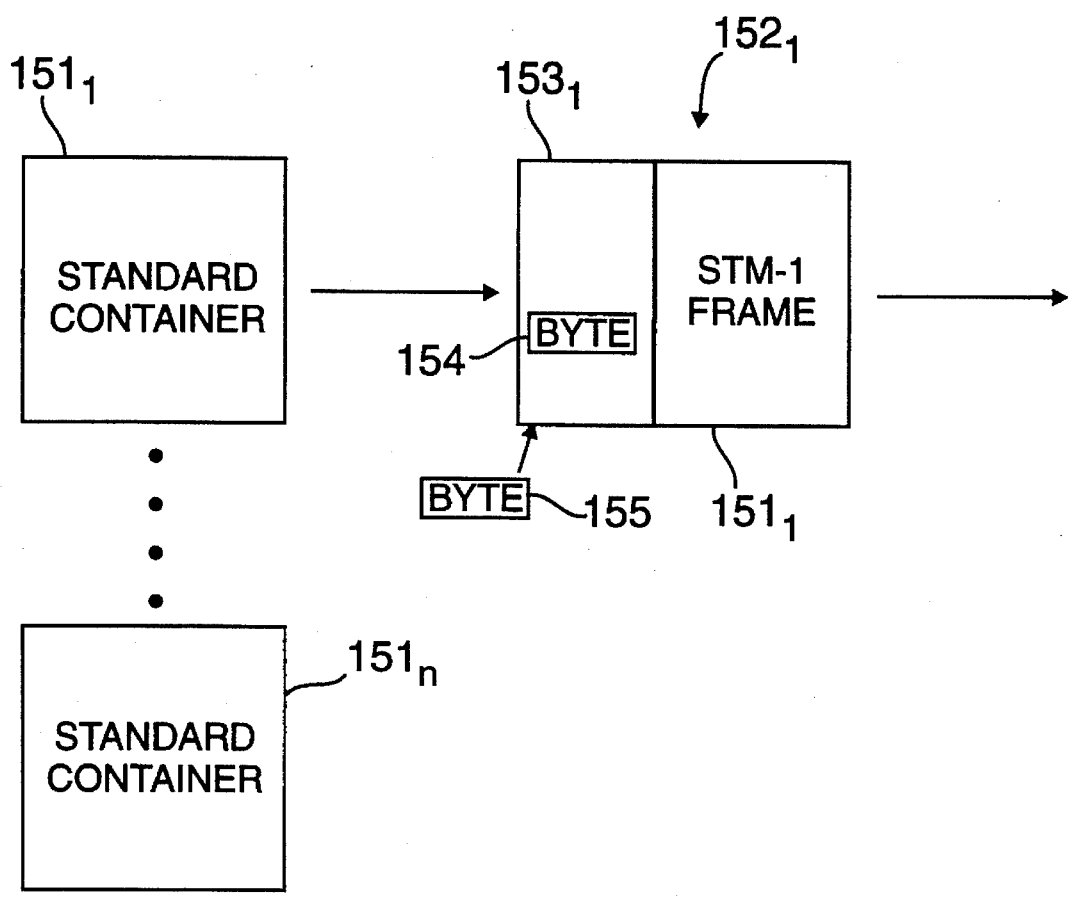
FIG. 2 illustrates the functional steps required to prepare a standard container for intrasystem transmission according to the present invention.

FIG. 2 illustrates the novel method of preparing a standard container for intrasystem transmission in a modified STM-1 frame. The resulting modified STM-1 frame may suitably transfer data within a system such as the one discussed in connection with FIG. 1 above. A multiframe signal is first provided in the form of a plurality of standard containers $151_1 \ldots 151_n$, which may suitably be four standard C-4 containers. As discussed above, an input port subrack may contain circuitry capable of providing such containers.

Figure 3:
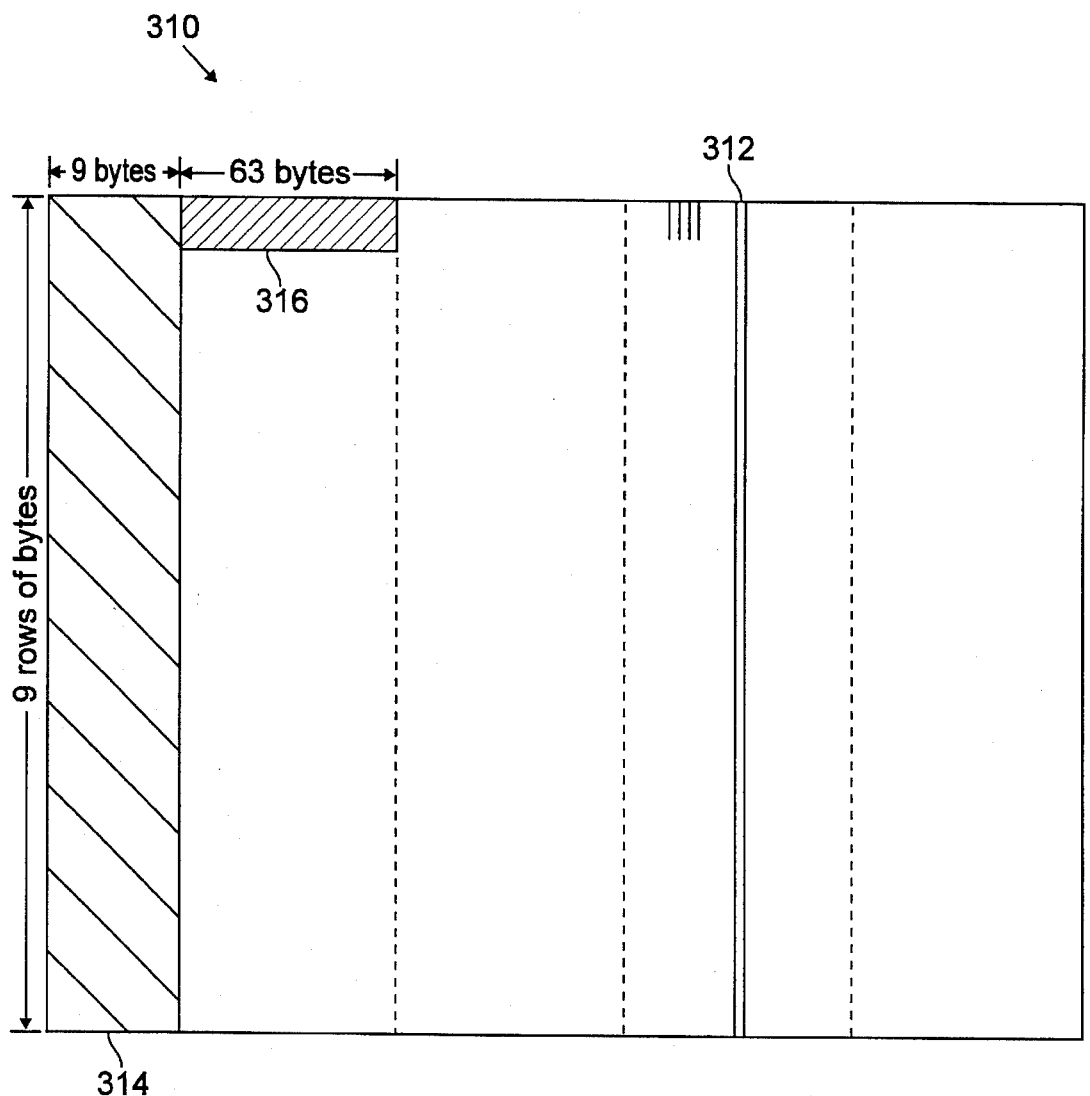
FIG. 3 shows a standard C-4 container which is a part of a multiframe signal comprising sixty-three multiplexed VC-12 containers.

FIG. 3 shows, in detail, a standard container 310, or C-4 container, which may be the first C-4 container $151_1$ of a multiframe signal as illustrated in FIG. 2, above. The arrangement of VC-12 data in such containers is well known in the art. The C-4 container 310 is composed of 261 byte columns as illustrated, for example, by byte column 312. The C-4 container 310 contains nine rows of bytes. Of the 261 byte columns, the first nine columns, illustrated as block 314 are not used for data, and may comprise fixed stuff. The remaining columns are split into four groups of sixty-three byte columns each. The lower order VC-12 containers may be time division multiplexed into these four groups of byte columns. As discussed above, however, the C-4 container 310 is only one of four consecutive C-4 containers required to hold sixty-three VC-12 containers. The C-4 container size is limited by the size of the STM-1 frame. See, for example, CCITT Recommendation G.709 §2.

If the C-4 container 310 is the first or second container in the multiframe signal, the container will include pointers that point to the beginning of each of the VC-12s within the multiframe. The pointers for the VC-12 containers are located within the first row of bytes and always occupy the bytes in the first sixty-three columns of data following the nine columns of fixed stuff, as illustrated by block 316. The pointers are located only within the first and second C-4 container of a multiframe signal. Each pointer points to the VC-12 within its column. The pointers are required because the VC-12s are not phase aligned, and therefore begin at different locations within the four C-4 containers of the multiframe signal. See CCITT Recommendation G.709 §3.3, FIGS. 3–13

It will be understood that the use of a multiframe to transmit sixty-three VC-12 containers is given by way of example only. Other multiframe configurations may suitably be used, including, for example, a multiframe signal required to transmit a plurality of VC-11 containers.

Returning to FIG. 2, the C-4 containers $151_1 \ldots 151_4$ are processed individually, starting with the first container $151_1$. The first standard C-4 container $151_1$ of the multiframe signal is converted to an STM-1 frame $152_1$ by adding an STM-1 section overhead $153_1$. The contents of the section overhead $153_1$ are dictated by the CCITT standard, and comprise frame alignment information, parity check data, and protection switching information. See CCITT Recommendation G.708 §5.2.1 & FIG. 3-4/G.708. The STM-1 section overhead further contains a user definable byte, or F1 byte 154. Use of the F1 user byte 154 is not otherwise defined or reserved by the SDH standard or CCITT recommendations. According to the method of the present invention, the MFS information 155, which indicates the relative position of the standard container within the multiframe signal, is inserted or written to the F1 user byte 154.

The MFS information 155 may be represented in binary form in the following manner. The MFS information 155 may, for example, uniquely identify each distinct frame in the multiframe. In other words, for the first standard container $151_1$ of the multiframe, an MFS indicator may suitably be 00, for the second standard container $151_2$, the MFS indicator may suitably be 01, for the third standard container $151_3$, the MFS indicator may suitably be 10, and so forth. Alternatively, the MFS information may simply provide a flag 1 bit for the first standard container 151, and provide a not-flag 0 bit for the remaining containers. The F1 user byte contains eight bits, thus allowing several options for representing the MFS information.

An STM-1 frame may then be transmitted by means well known in the art.

The method discussed above provides a simple way of preparing standard containers and multiframe synchronization information into STM-1 frames for intrasystem transmission. Once the STM-1 frame is generated, it may be transmitted within a system as discussed above in connection with FIG. 1.

The method of the present invention provides an improvement by eliminating the step of creating a VC-4 container, in other words, writing the VC-4 path overhead. The SDH standard requires the VC-4 for network transmissions. This step is not required in intrasystem communications because most of the information ordinarily contained within the VC-4 path overhead is only required for node to node network communication. The MFS information normally located in the VC-4 path overhead, however, is still needed within the system. According to the present invention, the MFS information may suitably be written to the STM-1 overhead, which requires relatively little processing compared to generating an entire VC-4 path overhead. Because substantial time delay and one or more pieces of hardware are associated with the generation of the VC-4 path overhead, the method of the present invention provides the advantage of reducing the hardware and time required to transmit the data in the standard containers $151_1 \ldots 151_4$.

Figure 4:
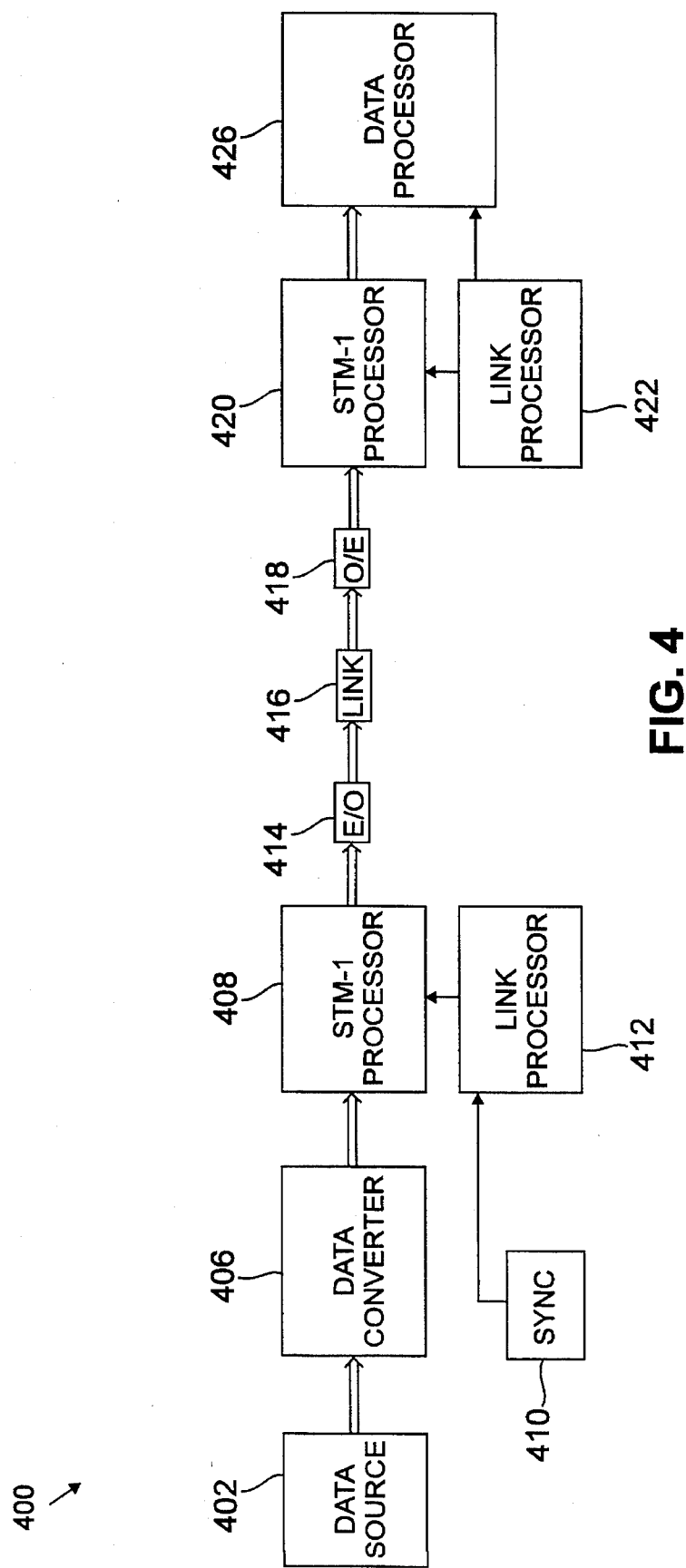
FIG. 4 illustrates a communication link for use between two subracks of a system which uses the method of the present invention to prepare, transmit and receive standard containers within the system.

FIG. 4 shows a communicative link 400 operable to create, transmit and receive the modified STM-1 frames such as STM-1 frame $152_1$ discussed above in connection with FIG. 2. The apparatus illustrated in FIG. 4 may suitably be employed in a node of a communication network such as the cross connect node 100 illustrated in FIG. 1 above. It will be understood that the generation and configuration of any of the containers or modules defined by the standard from either raw data or another container or module is well known. See generally CCITT Recommendations, above. The specific hardware required to perform any required data or pointer manipulation between defined blocks or modules will be readily apparent to one skilled in the art. It will be understood that each functional block is connected to system timing circuitry, not shown, which provides sequence and timing control to each block.

A data source 402 is connected to a data conversion means 406. The data source 402 may suitably be a circuit that receives STM-1 frames from an external network, not shown. In such a case, the data conversion means 406 would comprise circuitry for processing the STM-1 frames into standard containers, for example, C-4 containers. Alternatively, the data source 402 may suitably receive data in the VC-12 form or lower. In such a case, the data conversion means 406 would comprise circuitry for multiplexing and mapping such data into a C-4 container. Circuitry capable of receiving data in those forms and subsequently converting the data into C-4 or other standard containers is well known in the art.

The data conversion means 406 is operably connected to provide data in the form of a standard container to an STM-1 processor 408. The STM-1 processor 408 comprises circuitry for receiving data, generating an STM-1 section overhead and providing at the output an STM-1 frame comprising the data and the section overhead according to the CCITT standard. The generation of STM-1 frames is a basic function in SDH communication systems and is readily accomplished by one of ordinary skill in the art. See CCITT Recommendation G.708 §5.2.

A source of multiframe synchronization information 410 is connected to a link processor 412 and the data conversion means 406. The source 410 provides the MFS information to the link processor 412 and may comprise, for example, a portion of the system timing circuit. Whether or not the source of MFS information 410 comprises the system timing circuit, it will be understood that the timing circuitry may otherwise be connected to the various functional blocks for sequence and timing control. The link processor 412 is also connected to the STM-1 frame processor 408. The link processor 412 is operable to write information to the F1 user byte of the STM-1 overhead through interaction with the STM-1 frame processor. The hardware necessary to write information to the F1 user byte would be apparent to one skilled in the art.

The STM-1 frame processor 408 is further connected to provide STM-1 frames of data to electrical-to-optical conversion means 414. The electrical-to-optical conversion means 414 is connected through an optical link 416, which may be optical fiber of a variable length of greater than 10 meters, to an optical-to-electrical conversion means 418. The optical-to-electrical means 418 may, for example, represent the input to the cross connect subrack 106 discussed above in connection with FIG. 1.

At a remotely located subrack, the optical-to-electrical conversion means 418 is coupled to a second STM-1 frame processor 420. The second frame processor 420 is operable to receive STM-1 frames and remove the STM-1 section overhead from the data contained therein. Circuitry capable of performing the foregoing is well known in the art. The second STM-1 frame processor 420 is operably connected to provide the resulting data to a data processing means 426. The data processing means 426 may comprise circuitry capable of switching data at the VC-12 level. Alternatively, the data processing means 426 may comprise any circuitry that processes data on the VC-12 level.

The second STM-1 frame processor 420 is further connected to a second link processor 422. The link processor 422 is connected to the data processing means 426. The second link processor 422 is operable to extract data contained in the F1 user byte of the STM-1 frame. The F1 user byte is intended for user implementation and therefore circuitry capable of extracting such information would be readily apparent to one of ordinary skill in the art.

In operation, data is received from data source 402 and processed by data conversion means 406 in an ongoing manner. Upon command of the system timing circuitry, the source of MFS information 410 provides a signal indicating the beginning of a multiframe signal to the data conversion means 406 and the link processor 412. The data conversion means 406 then formulates and transmits the first standard container of the multiframe to the STM-1 frame processor 408. The STM-1 frame processor 408 then builds a STM-1 section overhead for the data. Concurrently, the link processor 412 writes the MFS information corresponding to the beginning of a multiframe to the F1 user definable byte of the STM-1.

This process may then be repeated for the remaining frames in the multiframe. For subsequent containers, however, the source of MFS information 410 provides a different signal, indicating that the frame is not the first container of a multiframe signal. The data conversion means 406 then formulates subsequent standard containers of the multiframe and the STM-1 frame processor 408 generates corresponding section overheads, including the MFS information. Further details on the preparation of the modified STM-1 frames according to the present invention is discussed above in connection with FIG. 2.

The modified STM-1 frames generated by the STM-1 frame processor 408 as discussed above are transferred through the electrical-to-optical conversion means 414 and the optical link 416 to an optical-to-electrical conversion means 418 located at another subrack within the system. At the other subrack, the modified STM-1 signals enter the second frame processor 420 wherein the section overhead of each STM-1 signal is interpreted. The frame processor 420 thereafter provides the standard containers from the STM-1 signals to the data processing means 426. Concurrently, the link processor 422 retrieves from the frame processor 420 the contents of each F1 user byte. The link processor 420 provides the F1 contents, which comprises the MFS information, to the data processing means 426. The data processing means 426 may thereafter access and process the data in the standard containers using the MFS information retrieved from the F1 user byte.

In an alternative embodiment of the communication link 400, the data may be transmitted as electrical signals instead of optical signals. In such an embodiment, the electrical-to-optical conversion means 414 would be replaced by a line transmitter, the optical link 416 would be replaced by coaxial cable, and the optical-to-electrical conversion means 418 would be replaced by a line receiver.

It will be understood that use of the invention for intra-system optical communication is not limited to a cross connect system in an optical network but can relate to any system in an optical network in which optical links connect the various parts of a localized system run from the same clock. By using the STM-1 frame to transmit the MFS information, the need for generating the VC-4 path overhead to transmit a standard container of data is not needed.

It will be further understood that the above-described arrangements of the invention are merely illustrative. Other arrangements may be devised by those skilled in the art which will embody the principles of the invention and fall within the spirit and scope thereof.

I claim:

1. A system for transmitting time division multiplexed (TDM) data arranged in a multiframe signal, the multiframe signal comprising a first standard container and one or more subsequent standard containers, within a node of a communication network that transmits data according to the synchronous data hierarchy standard, said system comprising:

a) a multiframe signal source operable to produce a standard container from the multiframe signal;

b) a source of multiframe synchronization information indicating whether the standard container is the first standard container in the multiframe signal;

c) a frame processor coupled to the multiframe signal source to receive the standard container therefrom, the frame processor operable to generate a synchronous transport module (STM) frame section overhead containing information used in the transmission of the standard container, the STM frame section overhead including a user definable byte, the frame processor further operable to generate an STM frame using the STM frame section overhead and the standard container; and d) a link processor coupled to the source of multiframe synchronization information to receive multiframe synchronization information therefrom, the link processor operably coupled to the frame processor to provide a signal representative of the multiframe synchronization information to a user definable byte of the section overhead.

2. The system of claim 1 further comprising means coupled to the frame processor for transmitting the synchronous transport module frame section overhead and the standard container of the STM frame.

3. They system of claim 1 further comprising:

e) an electrical-to-optical signal converter operably coupled to receive the STM frame from the frame processor; and f) means for transmitting optical signals coupled to the electrical-to-optical signal converter.

4. A method of transmitting TDM data arranged in a multiframe signal, the multiframe signal comprising a first standard container and one or more subsequent standard containers, within a node of a communications network that transmits data according to synchronous data hierarchy standard, the node comprising a plurality of subracks, the method comprising the steps of:

a) providing the first standard container of the multiframe signal to a frame processor;

b) providing a first multiframe indicator corresponding to the first standard container of the multiframe signal to the frame processor;

c) causing the frame processor to generate a synchronous transport module section overhead containing information used for transmitting the first standard container, the generation of the section overhead further including the step of inserting the first multiframe indicator therein, the first multiframe indicator containing information identifying the first standard container of the multiframe signal;

d) generating a first synchronous transport module frame comprising the first standard container of the multiframe signal and the synchronous transport module section overhead; and e) transmitting the first synchronous transport module frame from a first subrack of the plurality of subracks to a second subrack of the plurality of subracks.

5. The method of claim 4 further comprising the steps of:

f) providing a subsequent standard container of the multiframe signal to the frame processor;

g) providing a subsequent multiframe indicator identifying the subsequent standard container to the frame processor; and h) causing the frame processor to generate a subsequent synchronous transport module section overhead for the transmission of the subsequent standard container, the generation of the section overhead further comprising the step of inserting the subsequent multiframe indicator therein.

6. The method of claim 5 further comprising the step of:

i) repeating steps f) through h) for a plurality of subsequent standard containers comprising the multiframe signal.

7. The method of claim 6 wherein each subsequent multiframe indicator corresponding to each subsequent standard container is distinct.

8. The method of claim 6 wherein each subsequent multiframe indicator corresponding to each subsequent standard container is equivalent.

9. A system for transmitting data arranged in a multiframe signal, the multiframe signal comprising a first standard container and one or more subsequent standard containers, within a node of a communication network that transmits data according to the synchronous data hierarchy standard, said system comprising:

a) a multiframe signal source operable to produce a multiframe signal comprising a plurality of standard containers;

b) a means coupled to the multiframe signal source for generating multiframe synchronization information identifying the first standard container of the multiframe signal produced by the multiframe signal source;

c) a means for generating a synchronous transport module (STM) frame, the STM frame including a section overhead and data from the multiframe signal, said means coupled to the source of multiframe signals;

d) a means for providing a signal representative of the multiframe synchronization information to the means for generating a synchronous transport module frame such that said signal is inserted into the STM frame section overhead, said means coupled to the means for generating multiframe synchronization information.

* * * * *